United States Patent [19]

Paradise

[11] Patent Number: 5,242,695
[45] Date of Patent: Sep. 7, 1993

[54] EDIBLE TOPPING

[76] Inventor: Charles F. Paradise, 65 Adin Dr., Concord, Mass. 01742

[21] Appl. No.: 987,575

[22] Filed: Dec. 8, 1992

Related U.S. Application Data

[63] Continuation of Ser. No. 789,525, Nov. 7, 1991, abandoned, which is a continuation of Ser. No. 489,701, Mar. 7, 1990, abandoned.

[51] Int. Cl.$^5$ .............................. A23L 1/08; A23L 1/09
[52] U.S. Cl. ........................................ 426/93; 426/99; 426/100; 426/101; 426/103; 426/302; 426/305; 426/306; 426/659; 426/660
[58] Field of Search ............... 426/93, 98, 99, 100, 426/101, 103, 302, 305, 306, 659, 660

[56] References Cited

U.S. PATENT DOCUMENTS

| | | | |
|---|---|---|---|
| 95,492 | 10/1869 | Leger | 426/650 |
| 1,987,893 | 3/1931 | Dyce | 426/564 |
| 2,027,167 | 6/1934 | Harris | 426/660 |
| 2,690,972 | 10/1954 | Bradshaw | 426/659 |
| 3,307,953 | 3/1967 | Siebers | 426/631 |
| 3,784,713 | 1/1974 | Colten | 426/171 |
| 3,821,420 | 6/1974 | Arden | 426/45 |
| 3,982,042 | 9/1976 | Arden | 426/631 |
| 4,327,115 | 4/1982 | Kime | 426/12 |
| 4,753,814 | 6/1988 | Gilmore | 426/533 |

OTHER PUBLICATIONS

Dyce, "Producing Finely Granulated or Creamed Honey," in Honey, a Comprehensive Survey, Crane, ed. Heineman: London, 1975, pp. 293-306.

Morse, "The Dyce Process For Making Crystallized Honey," Gleanings in Bee Culture, Aug., 1983, pp. 441-442.

Morse, "Finely Crystallized or Granulated Honey," Cornell University, 1984.

Heemskerk, "Chocolate Spreads: Formulation and Technology," The Manufacturing Confectioner, pp. 40-41, Aug. 1981.

*Primary Examiner*—Jeanette Hunter
*Assistant Examiner*—Helen Pratt
*Attorney, Agent, or Firm*—Fish & Richardson

[57] ABSTRACT

An edible syrup product, useful as a sundae topping for ice cream, includes encrystallized glucose and vegetable fat, the quantity of glucose in the product relative to the quantity of vegetable fat being a predetermined ratio so that the product has a semiliquid consistency at a first temperature, a liquid consistency at a second temperature, and a chewy consistency at a third temperature. Preferably, the formulation consists of 65% encrystallized honey, 27% chocolate liquor, and 8% crushed pecans.

14 Claims, No Drawings

EDIBLE TOPPING

This is a continuation of application Ser. No. 07/789,525, filed Nov. 7, 1991, now abandoned which is a continuation of Ser. No. 07/489,701 filed Mar. 7, 1990, now abandoned.

BACKGROUND OF THE INVENTION

This invention relates to food products useful as edible toppings, especially for chilled desserts.

Fat-based dessert toppings, such as those with chocolate as the basic ingredient, acquire a liquid consistency when heated and harden to a brittle consistency when applied to a cold dessert such as ice cream. These toppings are high in caloric content.

Water-based toppings, lower in caloric content than fat-based, generally have a pudding consistency when cool and form a light sauce when heated.

Caramel toppings have a chewy consistency derived from heating a sugar-butter-cream mixture to a high temperature.

SUMMARY OF THE INVENTION

This invention features a syrup product, useful as an edible topping, that includes encrystallized glucose and vegetable fat, the quantity of encrystallized glucose in the product relative to the quantity of vegetable fat being a predetermined ratio so that the final product has a semi liquid consistency at a first temperature, a liquid consistency at a second temperature, and a chewy consistency at a third temperature. The product has been termed "oleocrystalline" in composition.

By encrystallized glucose is meant glucose that has been intentionally crystallized to form fine glucose crystals, i.e., crystals too small to be felt by the tongue, by a process such as the Dyce process disclosed in U.S. Pat. No. 1,987,893; or glucose that has been allowed to crystallize naturally to form such fine crystals. By vegetable fat is meant any fat product naturally derived from a vegetable source (as opposed to an animal source) or any synthetic fat product based on such vegetable product.

The quantity of encrystallized glucose may be between two and four times, or approximately two and one half times, the quantity of vegetable fat; the first temperature may be below body temperature (or 65° F.); the second temperature may be slightly above body temperature (or 105°), and the third temperature may be slightly above freezing (or 40° F.). A supplemental sugar may be present in the topping in addition to the encrystallized glucose; the supplemental sugar may be fructose and may be present in the topping in equal proportion to the encrystallized glucose. The two sugars may be in the form of encrystallized honey; the vegetable fat may be in the form of chocolate liquor. Other suitable sources of encrystallized glucose are high fructose corn syrup or invert syrup, and other supplemental sugars that could be present in the topping instead of fructose are maltose or sucrose. Other sources of the vegetable fat include cocoa butter, cocoa powder, or coconut oil.

The topping invention, based on encrystallized glucose and vegetable fat, combines the rich taste of toppings substantially based on vegetable fat with the lighter taste of water-based dessert toppings. The resulting topping is shelf-stable and nonspoiling and has a unique chewy consistency when it is applied to a chilled dessert. Because the topping can be prepared without resorting to high temperatures, flavoring ingredients such as chocolate and carob that would suffer breakdown at high heat can easily be incorporated.

Other features and advantages of the invention will be apparent from the following detailed description and from the claims.

The invention comprises a shelf-stable, nonspoiling, semiliquid syrup topping that becomes chewy in consistency when placed in contact with a cold dessert such as ice cream. The topping has been termed "oleocrystalline" in composition. An exemplary formulation consists of encrystallized honey (65%), chocolate liquor (27%), and pecans (8%).

To prepare the topping, fifty pounds of honey, obtainable from a beekeeper, is first encrystallized by the well known Dyce process (U.S. Pat. No. 1,987,893, hereby incorporated by reference). Specifically, the honey is heated in a kettle until a temperature of approximately 160° F. is reached, to destroy any microbiological contamination, e.g., from yeast, and to dissolve any existing crystals. The heated honey is then cooled rapidly to about 75° F., e.g., by circulating cold water in the jacket of the kettle, and seeded with about a 5% volume of honey previously put through the Dyce process which contains the typical fine glucose crystals of Dyce processed honey.

Rapid replication of the fine crystals in the honey starter continues as the honey is agitated at 75° at low r.p.m. (so as not to incorporate air) for 1-3 hours or until the honey becomes opaque and the mixing equipment begins to strain. The honey syrup is again warmed, this time to about 105° F., and 20.7 lbs. of chocolate liquor (55% fat) (Baker's Chocolate) is added. As the chocolate melts, it is mixed thoroughly with the syrup. To complete the product, 6.2 lbs. of finely ground, roasted pecans are folded into the chocolate-honey mixture to provide a pleasing texture. The topping is then poured into bottles or serving containers and stored at (50° F.) at which temperature the crystallization process continues to completion.

A topping sample prepared in the above manner has a viscosity at 105° F. of 142,000 cps, a viscosity at 120° F. of 99,700 cps, and a viscosity at 135° F. of 52,600 cps, as determined using a Brookfield Model LVT viscometer. At lower temperatures, viscosity measurements on the sample are not meaningful.

For use, the topping is warmed to between 95°-105° F., in, e.g., a water bath or a microwave oven, and ladled onto the desired dessert, e.g., ice cream or frozen yogurt. Upon contact with the cold confection, the topping hardens to a chewy consistency. The warmed topping is thus liquid when it is poured, typically at a temperature of the order of 95°-105° F. Coming into contact with the cold dessert, the topping releases heat to the cold dessert, and the topping chills to around 40° F., which may be regarded as a cold dessert temperature. Alternatively, the topping can be used as a dip for an ice cream or frozen yogurt cone. Care should be taken not to overheat the topping because temperatures above 114° F. can cause a slow but pronounced return of the glucose crystals to solution, with a loss of the characteristic chewiness of the served topping.

Other embodiments are within the following claims.

For example, high fructose corn syrup or invert syrup are readily available, economical substitutes for honey (which contains equal quantities of glucose and fructose). However, they will not provide a topping with honey's flowery flavors. Alternatively, preparation of the topping could begin with pure glucose syrup. If this method is used, it is desirable to provide an equal quantity of another sugar, such as fructose, maltose, or sucrose, that will not crystallize, itself, during the Dyce processing step and will prevent the glucose from over-crystallizing.

Methods of forming fine glucose crystals other than the Dyce process could be used in preparation of the topping, or the glucose could be allowed to form fine crystals naturally. However, crystals formed upon natural, unaided glucose crystallization are usually too coarse to be used in the invention.

Any source of vegetable fat other than chocolate liquor could be used in the new topping. Cocoa powders of high cocoafat content are frequently used, supplemented when necessary with additional vegetable fat such as coconut oil. Cocoa butter is a very useful source of fat as it is well-known in the candy industry. A cocoa butter based topping can be provided with any desired flavoring, for example, carob.

Any additional flavorings or any other kinds of nuts could be used to supplement any topping.

What is claimed is:

1. An edible syrup product for contacting a cold dessert comprising,
   encrystallized glucose and
   vegetable fat, wherein the quantity of said encrystallized glucose in said product relative to the quantity of said fat is a predetermined ratio establishing a chewy consistency of said edible syrup product at a cold dessert temperature when in contact with said cold dessert,
   said edible syrup product being also crystalline in composition and a liquid at a liquid temperature significantly higher than said cold dessert temperature thereby allowing the syrup to be poured over said cold dessert to release heat to said cold dessert and assume said cold dessert temperature,
   said vegetable fat and encrystallized glucose being compositions establishing said edible syrup product as shelf-stable and non-spoiling.

2. The product of claim 1 wherein the quantity of said glucose in said product is between two and four times the quantity of said vegetable fat.

3. The product of claim 2 wherein the quantity of said glucose in said product is approximately two and one half times the quantity of said vegetable fat.

4. The product of claim 1 wherein said liquid temperature is of the order of 105° F.

5. The product of claim 1 wherein said cold dessert temperature is above freezing approximately of the order of 40° F.

6. The product of claim 1 further comprising a supplemental sugar.

7. The product of claim 2 wherein the quantity of said supplemental sugar is approximately equal to the quantity of said glucose.

8. The product of claim 1 wherein said encrystallized glucose is provided by encrystallized honey.

9. The product of claim 1 wherein said encrystallized glucose is provided by encrystallized high fructose corn syrup or invert syrup.

10. The product of claim 6 wherein said supplemental sugar comprises any one of fructose, maltose or sucrose.

11. The product of claim 1 wherein said vegetable fat comprises chocolate liquor.

12. The product of claim 1 wherein said vegetable fat comprises cocoa butter.

13. The product of claim 1 wherein said vegetable fat comprises cocoa powder or coconut oil.

14. An edible syrup product comprising
    encrystallized honey at 65%,
    chocolate liquor at 27%, and
    crushed pecans at 8%.

* * * * *